Patented Apr. 13, 1943

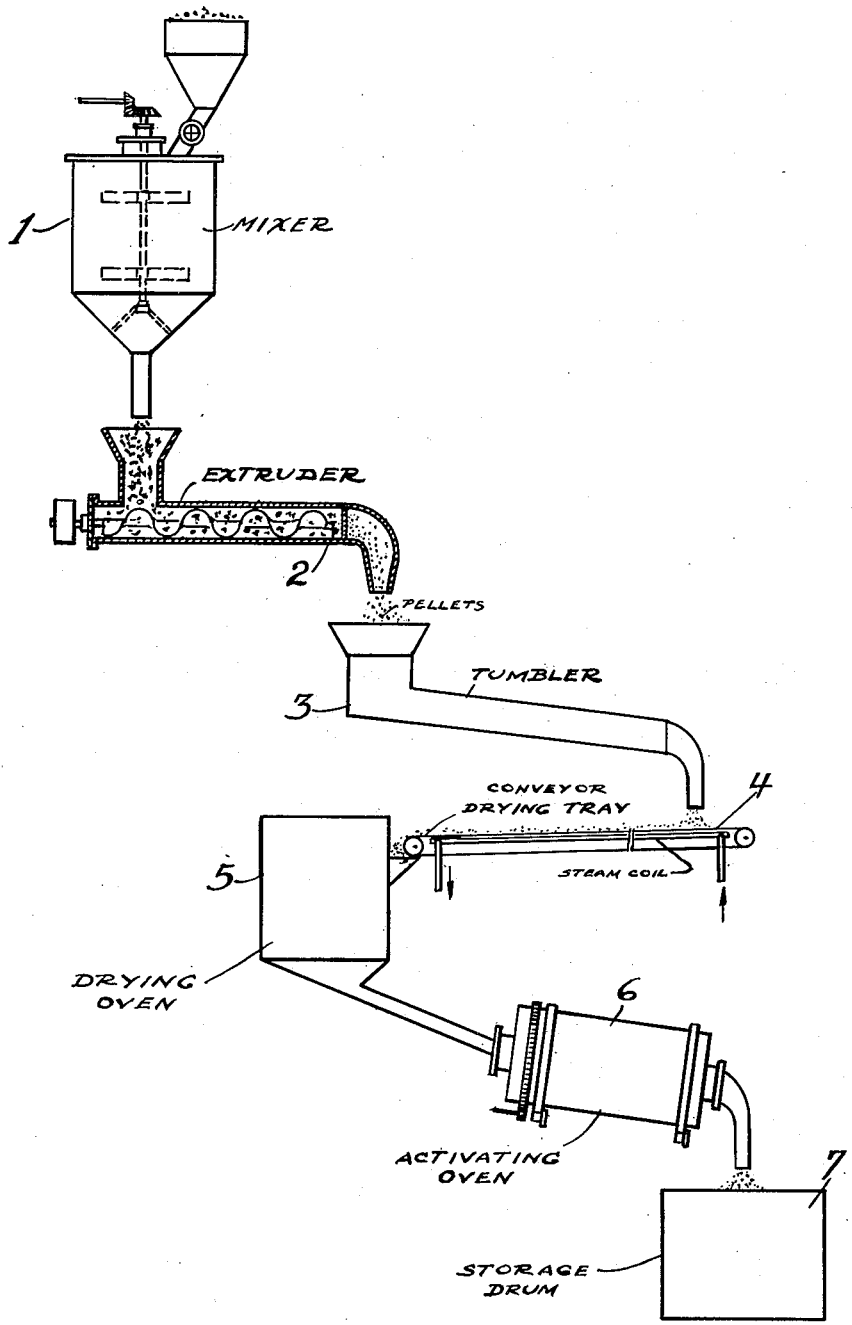

2,316,726

UNITED STATES PATENT OFFICE 2,316,726

METHOD OF PREPARING CATALYST

William E. Spicer and Kurt G. Schrey, Baton Rouge, La., assignors to Standard Oil Development Company, a corporation of Delaware Application October 21, 1941, Serial No. 415,864

6 Claims. (Cl. 252—259.2)

This invention relates to the preparation of catalysts to be used in fixed or stationary form and is more particularly concerned with certain improvements in the method of preparation by means of which the powdering characteristics of the lumps of dried catalyst are substantially reduced.

Catalysts for use in processes such as catalytic reforming, catalytic cracking, catalytic dehydrogenation, catalytic aromatization and the like are prepared in one of two forms depending upon the type of operation in which they are to be used. If the catalyst is to be suspended in the hydrocarbon liquid or vapors to be treated, it is prepared in the form of a finely divided powder. On the other hand, if the catalyst is to be used in fixed or stationary form, i. e. rigidly arranged in a reaction chamber through which the hydrocarbons to be treated are passed, it is prepared in the form of small lumps or pieces having any suitable shape and relatively small dimensions, say $\frac{1}{16}$ to $\frac{3}{4}$ inch in length and $\frac{1}{16}$ to $\frac{3}{4}$ inch in diameter. The present invention is concerned with the preparation of catalysts to be used in stationary form.

There are several methods for preparing stationary catalysts. For use in the laboratory or on a small scale it is immaterial which method is used. However, for use in commercial plants where the quantity of catalyst required is large, the cost of preparing the catalyst represents an appreciable item of expense and of course the cheapest and most efficient method must be used. It is found that the "extrusion method" is the most satisfactory for the preparation of large quantities of catalyst. According to this method, the ingredients of the catalyst are mixed together to form a paste of a consistency suitable for extrusion, the paste is passed through an extrusion apparatus, the extruded strings or ribbons are cut up into short lengths, and the small pieces are dried and finally heated to a high temperature for activation.

We have found that the extruded pellets after drying and heating have a tendency to powder excessively during handling because of their rough edges. Powdering of the catalyst causes plugging of the exit lines from the reaction vessel frequently making it necessary to shut down to clean them out. The present invention has for its principal object the provision of a means for materially reducing the powdering tendency of the extruded pellets.

In accordance with the invention, the wet extruded pellets, before drying, are passed through a rotating cylinder wherein they are tumbled around and the rough edges thereby smoothly rounded off.

The method of carrying out the invention will be more fully understood from the following description when read with reference to the accompanying drawing which is a diagrammatic sketch showing the principal parts of an apparatus suitable for our purposes.

Referring to the drawing, numeral 1 designates a mixing device in which the ingredients of the catalyst are thoroughly mixed with sufficient water or aqueous medium to form a paste of suitable consistency for extrusion. The paste passes from the mixer to an extrusion machine 2 wherein it is forced through a die or slot of the desired shape and size. The extruded paste is cut up into small pellets as it emerges and the pellets are then introduced into a tumbling means designated by numeral 3 wherein they tumble around until the rough edges and corners are smoothed off. The construction of the tumbling means may be similar to that of an ordinary rotary drier, except for the fact that no provision need be made for heating and circulating gases through the cylinder. The angle of inclination and the speed of rotation of the cylinder may be regulated so that the pellets will remain in the cylinder for the proper length of time. For example, the rotating cylinder may be about 17 feet long and have a diameter of about 10 inches. The angle of inclination between the cylinder and the horizontal may be from 1 to 5 degrees and the cylinder may be rotated at speeds of 40–70 revolutions per minute. The length of time the pellets remain in the tumbling means may be regulated but in most cases from 15 to 30 minutes is sufficient to round off the rough edges.

After leaving the tumbling means 3, the pellets are collected on drying trays 4 which are placed in a drying oven 5. From the drying oven 5 the dried pellets are removed to a heating and activating oven 6 wherein they are heated to a high temperature sufficient to drive off a substantial amount of moisture and other volatile matter. The dried, activated pellets are then collected in a storage drum 7.

The following experiments illustrate the effectiveness of the present method in preventing powdering of dried catalyst pellets. The catalyst used is one which is very effective in the catalytic reforming in the presence of hydrogen of hydrocarbon oils boiling in the gasoline range, and consists of a major proportion of aluminum oxide and a minor proportion of molybdenum oxide:

Powdered alumina hydrate is mixed with a sufficient quantity of a solution of ammonium molybdate to form a paste of a consistency suitable for extrusion. One portion of the paste is passed through the extrusion means, and the pellets are dried and activated in the usual way. Another portion of the paste is passed through the extrusion means and the wet pellets before being dried are passed through a tumbling means such as that described above.

The powdering characteristics of the two catalysts are then compared by placing them in a small ball mill and rotating them for a period of time and then determining the amount of powder which has been formed. The results are as follows:

|  | Powder produced by rotating for— | |
|---|---|---|
|  | 15 minutes | 45 minutes |
|  | Per cent | Per cent |
| Dried "untumbled" pellets | 0.9 | 1.9 |
| Dried "tumbled" pellets | 0.1 | 0.1 |

It will be noted that the catalyst prepared in accordance with the method of the present invention after being rotated in the ball mill for 45 minutes has only formed 0.1% of powder whereas the catalyst prepared in accordance with the known method has formed 1.9% of powder. While this amount of powder may not appear to be very great, it will be understood that when large batches of catalyst are prepared for commerical units, the loss of such an amount to powder during handling of the catalyst represents an important loss which increases the cost of preparing the catalyst to an appreciable extent because the powdered catalyst must be re-processed. In addition, as pointed out above, powdering of the catalyst in the reaction vessel is objectionable because it causes plugging of the exit lines.

This invention is not limited by any theories of the mechanism of the reactions involved nor by any details given merely for purposes of illustration, but is limited only in and by the following claims in which it is intended to claim all novelty inherent in the invention.

We claim:

1. The method of preparing a catalyst to be used in a stationary form which comprises making a paste of the ingredients having a consistency suitable for passage through an extrusion means, forcing the paste through an extrusion means, cutting the extruded mass into pieces of short length, passing the pieces through a rotating means in which they are tumbled about for a time sufficient to smooth out rough edges, and then drying and activating the smoothed pieces.

2. The method of preparing a catalyst comprising a major proportion of aluminum oxide and a minor proportion of molybdenum oxide to be used in a stationary form which comprises making a paste of powdered aluminum oxide and a solution of ammonium molybdate, forcing said paste through an extrusion means, cutting the extruded mass into pieces of relatively short length, passing the pieces through a rotating means in which they are caused to tumble about for a time sufficient to smooth out rough edges, and then drying and activating the pieces.

3. In the preparation of a catalyst in the form of small pieces to be rigidly arranged in a reaction chamber by forcing a paste of the catalyst ingredients through an extrusion means and then drying and activating the extruded pieces, the method of substantially reducing the powdering characteristics of the dried pieces of catalyst which comprises passing the extruded pieces before drying through a rotating means in which they are tumbled about for a time sufficient to smooth out the surface of the pieces.

4. The method set forth in claim 1, in which one of the ingredients is water and another is powdered catalyst material.

5. The method set forth in claim 2, in which the ammonium molybdate is dissolved in water.

6. The method set forth in claim 3, in which the paste is made by mixing the catalyst ingredients with water.

WILLIAM E. SPICER.
KURT G. SCHREY.